(12) United States Patent
Bochenek

(10) Patent No.: US 9,126,546 B2
(45) Date of Patent: Sep. 8, 2015

(54) SYSTEM AND METHOD TO MINIMIZE CONTAMINATION OF A REAR VIEW CAMERA LENS

(75) Inventor: Jeffrey Bochenek, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/272,608

(22) Filed: Oct. 13, 2011

(65) Prior Publication Data

US 2013/0094086 A1 Apr. 18, 2013

(51) Int. Cl.
*G02B 27/00* (2006.01)
*B60R 1/00* (2006.01)
*B60R 11/04* (2006.01)
*H04N 7/18* (2006.01)
*B62D 35/00* (2006.01)

(52) U.S. Cl.
CPC . *B60R 11/04* (2013.01); *B60R 1/00* (2013.01); *B62D 35/007* (2013.01); *G02B 27/0006* (2013.01); *H04N 7/18* (2013.01)

(58) Field of Classification Search
CPC ........ G02B 27/006; B60R 1/00; B60R 11/04; H04N 7/18
USPC ................... 348/148; 359/507, 509
See application file for complete search history.

(56) References Cited

U.S. PATENT DOCUMENTS

| | | | |
|---|---|---|---|
| 3,653,709 A * | 4/1972 | Gravett | 296/91 |
| 4,838,603 A * | 6/1989 | Masoero et al. | 296/180.1 |
| 4,881,772 A * | 11/1989 | Feinberg | 296/180.1 |
| 4,898,458 A | 2/1990 | McDonald | |
| 5,069,397 A * | 12/1991 | Haslund | 244/1 R |
| 5,096,287 A * | 3/1992 | Kakinami et al. | 352/132 |
| 5,140,719 A * | 8/1992 | Cowan | 15/313 |
| 5,760,828 A * | 6/1998 | Cortes | 348/143 |
| 6,077,361 A * | 6/2000 | Glenn | 134/21 |
| 6,554,210 B2 | 4/2003 | Holt et al. | |
| 6,793,416 B2 | 9/2004 | Peterson et al. | |
| 6,819,231 B2 * | 11/2004 | Berberich et al. | 340/435 |
| 6,944,908 B2 | 9/2005 | Hoetzer et al. | |
| 7,006,129 B1 | 2/2006 | McClure | |
| 7,311,405 B2 * | 12/2007 | Irvin | 359/507 |
| 8,342,757 B2 * | 1/2013 | Tregnago et al. | 396/419 |
| 2007/0103780 A1 | 5/2007 | Cooper | |

(Continued)

FOREIGN PATENT DOCUMENTS

DE 4111635 10/1991
DE 4022085 1/1992

(Continued)

OTHER PUBLICATIONS

Office Action from the European Patent Office for Application No. 12187813.6 dated Apr. 7, 2014 (3 pages).

(Continued)

*Primary Examiner* — Ricky D Shafer
(74) *Attorney, Agent, or Firm* — Michael Best & Friedrich LLP

(57) ABSTRACT

A system for minimizing the accumulation of debris on a lens of a rear view camera of a vehicle, wherein the lens has a lens surface, includes a formed channel having a first end and a second end. The first end is in fluid communication with an external airstream effected by movement of the vehicle. The second end is disposed adjacent to the lens and is configured to direct a portion of the passing airstream over the lens surface.

13 Claims, 9 Drawing Sheets

(56) References Cited

U.S. PATENT DOCUMENTS

| | | | |
|---|---|---|---|
| 2007/0182817 A1* | 8/2007 | Briggance | 348/118 |
| 2009/0250533 A1* | 10/2009 | Akiyama et al. | 239/284.1 |
| 2011/0073142 A1* | 3/2011 | Hattori et al. | 134/56 R |
| 2011/0266375 A1* | 11/2011 | Ono et al. | 239/589 |
| 2011/0292212 A1* | 12/2011 | Tanabe et al. | 348/148 |
| 2012/0133768 A1* | 5/2012 | Stephan | 348/148 |
| 2012/0162428 A1* | 6/2012 | Wee | 348/148 |
| 2012/0242833 A1* | 9/2012 | Yamaguchi et al. | 348/148 |

FOREIGN PATENT DOCUMENTS

| | | | |
|---|---|---|---|
| DE | 10302748 | | 8/2004 |
| DE | 102004039450 | * | 3/2006 |
| JP | 04138943 A | * | 5/1992 |
| JP | 8113082 | | 5/1996 |
| JP | 10339906 | | 12/1998 |
| JP | 2001171491 A | * | 6/2001 |
| JP | 2002240628 A | * | 8/2002 |
| JP | 2003175806 | | 6/2003 |
| JP | 2004182080 A | * | 7/2004 |
| JP | 2006193070 A | * | 7/2006 |
| JP | 2007053448 A | * | 3/2007 |
| JP | 2009083730 A | * | 4/2009 |
| JP | 2009286216 A | * | 12/2009 |

OTHER PUBLICATIONS

European Search Report for EP Appl. No. 12187813.6 dated Jan. 25, 2013, 5 pages.

* cited by examiner

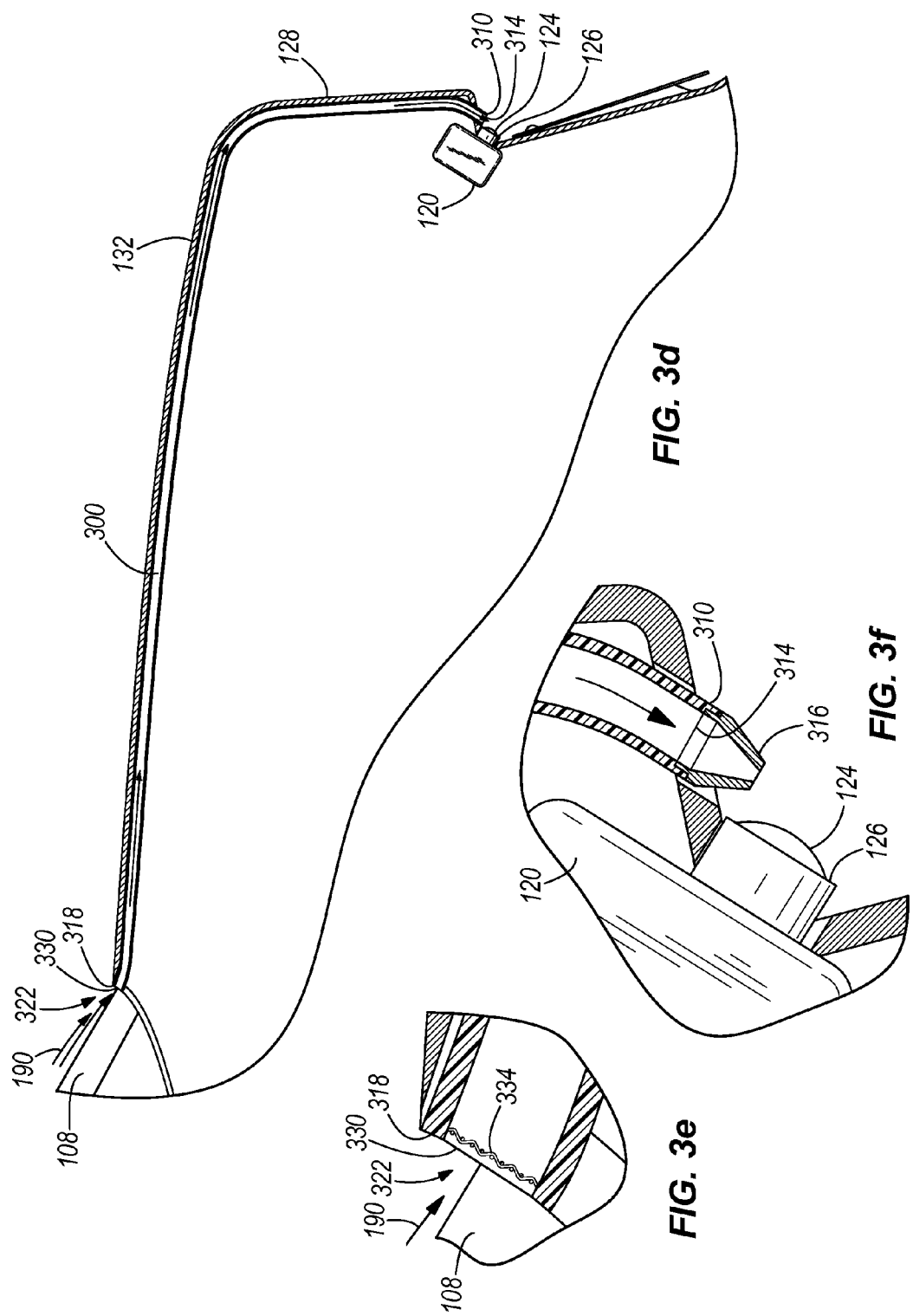

SYSTEM AND METHOD TO MINIMIZE CONTAMINATION OF A REAR VIEW CAMERA LENS

BACKGROUND

The present invention relates to a system and method for minimizing contamination of a rear view camera lens of a vehicle.

An increasing number of automobile manufacturers are including rear view cameras in vehicles. Such cameras are mounted at the rear of the vehicle, for example, on the trunk of a sedan. The camera lens is typically positioned at an angle to capture a view from the rear bumper to several feet behind the vehicle. Rear view cameras aid drivers in reversing in tight spaces and add an additional component of safety to everyday driving.

SUMMARY

The lens of a rear view camera, by virtue of its rear-mounted position in a vehicle, has the potential to accumulate dirt and debris, reducing the clarity of the images provided and the effectiveness of the camera.

In one embodiment of a system for minimizing the accumulation of debris on a lens of a rear view camera of a vehicle, wherein the lens has a lens surface, the system includes a formed channel having a first end and a second end. The first end is in fluid communication with an external airstream effected by movement of the vehicle. The second end is disposed adjacent to the lens and configured to direct a portion of the passing airstream over the lens surface.

In one embodiment of an airflow device for minimizing the accumulation of debris on a lens surface of a rear view camera of a vehicle, wherein the vehicle includes a trunk having a deck lid, the airflow device includes a channel extending between a first opening located within a rear half of the vehicle and a second opening positioned at a rear face of the deck lid. The first opening is configured to receive a portion of a passing airstream effected by forward motion of the vehicle. The second opening is disposed adjacent to the lens surface and configured to direct the portion of the passing airstream across the lens surface.

In one embodiment of a method of minimizing the accumulation of debris on a lens surface of a rear view camera of a vehicle, wherein the rear view camera is located at a rear portion of the vehicle, the method includes moving the vehicle in a forward direction to effect a stream of air with respect to the vehicle. The method further includes directing a portion of the stream of air over the lens surface.

Other aspects of the invention will become apparent by consideration of the detailed description and accompanying drawings.

BRIEF DESCRIPTION OF THE DRAWINGS

FIG. 1b is an enlarged partial perspective view of the system of FIG. 1a.

FIG. 2b is an enlarged partial perspective view of the system of FIG. 2a.

FIG. 2d is an enlarged partial front view of the system of FIG. 2a.

FIG. 3b is an enlarged partial perspective view of the system of FIG. 3a.

FIG. 3c is an enlarged partial top view of the system of FIG. 3a.

FIG. 3d is a cross section view taken along line 3d-3d of FIG. 3c.

FIG. 3e is an enlarged partial cross section view of the system shown in FIG. 3d.

FIG. 3f is an enlarged partial cross section view of the system shown in FIG. 3d.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1A:
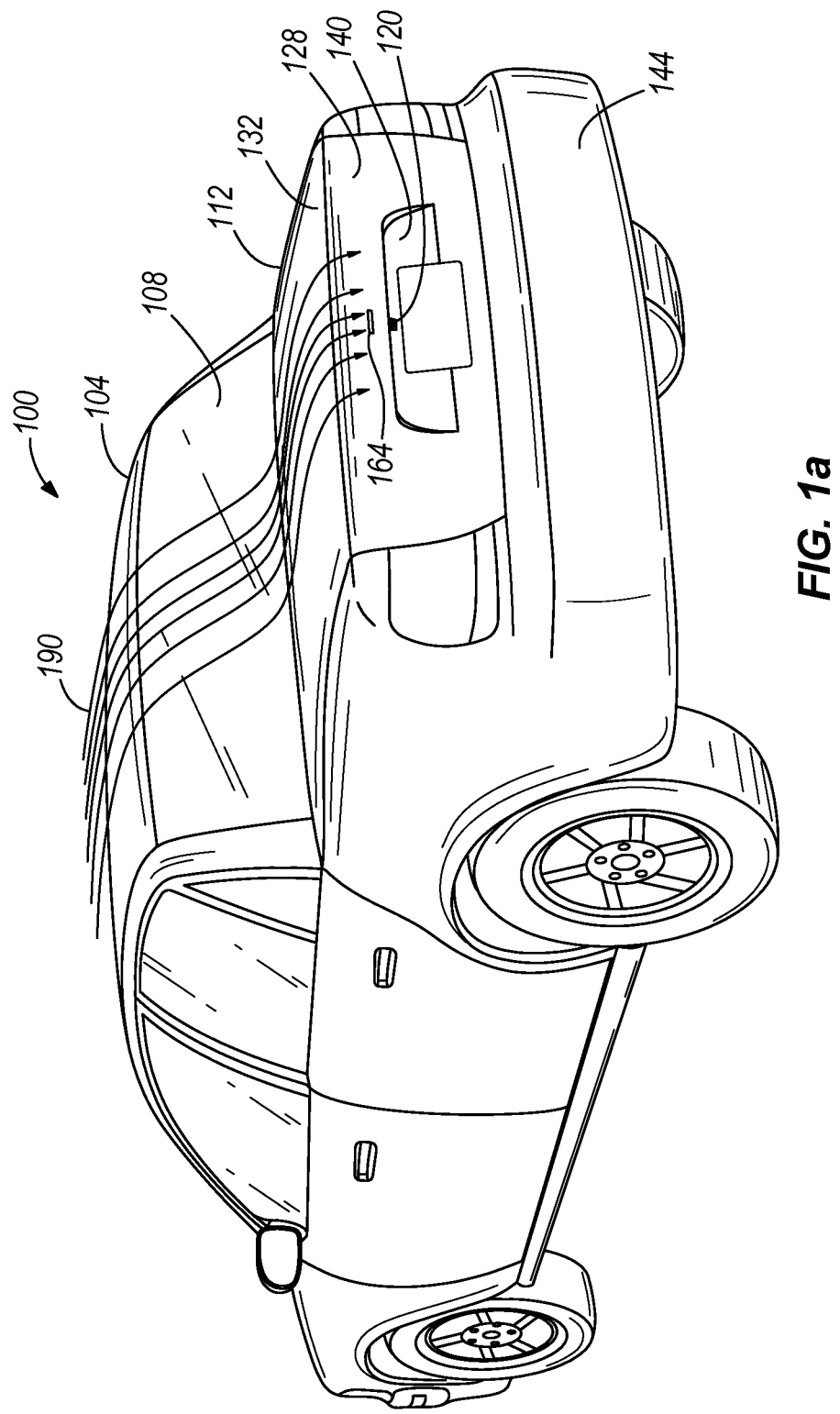
FIG. 1a is a perspective view of a vehicle showing a system for cleaning the lens of a rear view camera integrated with the trunk of the vehicle.
Figure 1C:
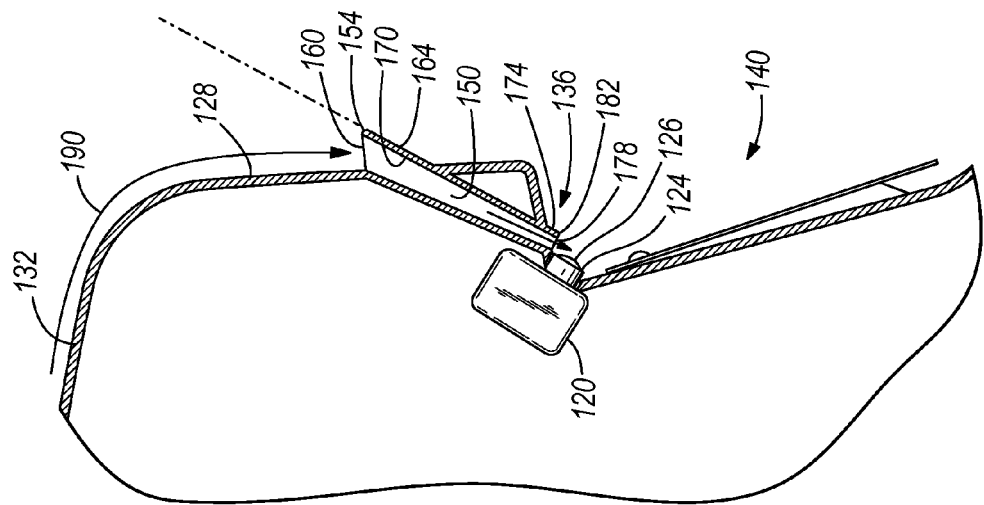
FIG. 1c is a cross section view taken along line 1c-1c of FIG. 1b.
Figure 1B:
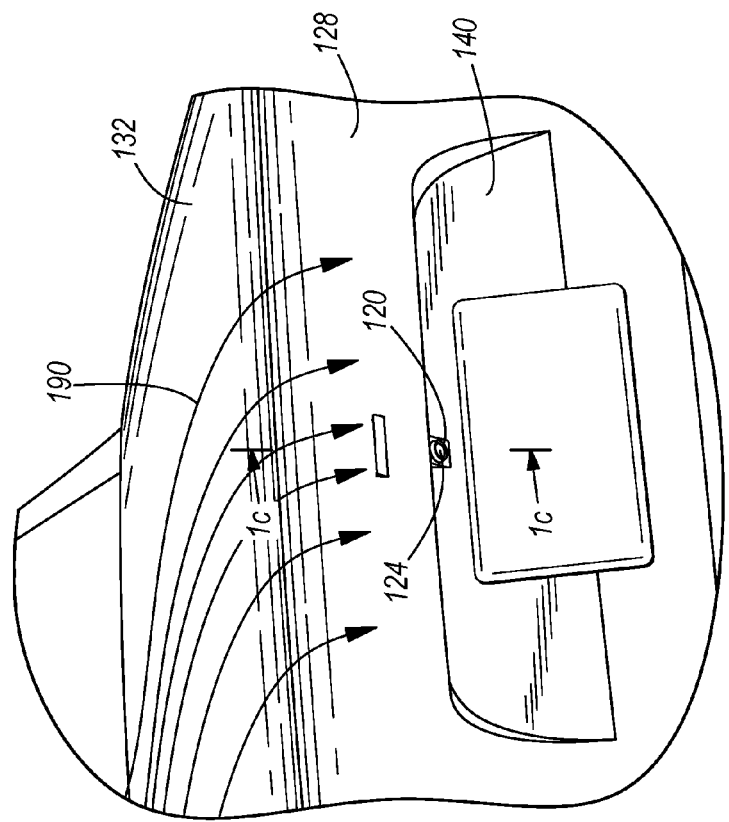

FIG. 1a illustrates a conventional motor vehicle 100 having a vehicle body including a roof 104, a rear windshield 108, and a trunk 112. A rear view camera 120 is mounted adjacent to the rear face 128 of the deck lid 132. Specifically, referring to FIGS. 1a-1c, the camera 120 is integrated into the deck lid 132 such that a camera lens 124 with a lens surface 126 protrudes from an upper portion 136 of the rear license plate depression 140 formed in the rear face 128. The lens 124 is positioned to capture images of the rear bumper 144 and the driving surface adjacent to the bumper 144 and rearward several feet, as is well known to those of ordinary skill in the art. As shown in FIG. 1c, a channel 150 formed in the rear face 128 includes a first end 154 with a first opening 160. The first end 154 includes a first deflector 164 that extends from the rear face 128 and presents a deflector face 170 angled with respect to the rear face 128. A second end 174 of the channel 150 is positioned at the upper portion 136 of the rear license plate depression 140. The second end 174 includes a second opening 178 located adjacent to the camera lens surface 126. The second opening 178 is generally smaller in cross sectional area than the first opening 160. In the illustrated embodiment, the second end 174 includes a second deflector 182 that is angled coincident with the first deflector 164. In some constructions, the first and second deflectors 164, 182 are removably attachable to the deck lid 132. In yet other constructions, the second end 174 does not include a deflector.

In operation, as the vehicle 100 moves forward, an airstream 190 is created that flows past the vehicle body. The airstream 190 flows over the rear windshield 108 and across the deck lid 132. A portion of this airstream 190 flows downward across the rear face 128. The first deflector 164 directs a fraction of the flowing air into the first opening 160 of the channel 150. This air flows within the channel 150 to the second opening 178 where it is expelled. The expelled air, by virtue of the configuration of the channel 150 and the deflectors 164, 182, is directed to the camera lens 124 and provides a component of velocity across the lens surface 126 that inhibits or minimizes the accumulation of debris, particulate matter, and/or moisture on the lens 124 and in addition removes debris and moisture that may have accumulated on the lens 124.

Figure 2A:
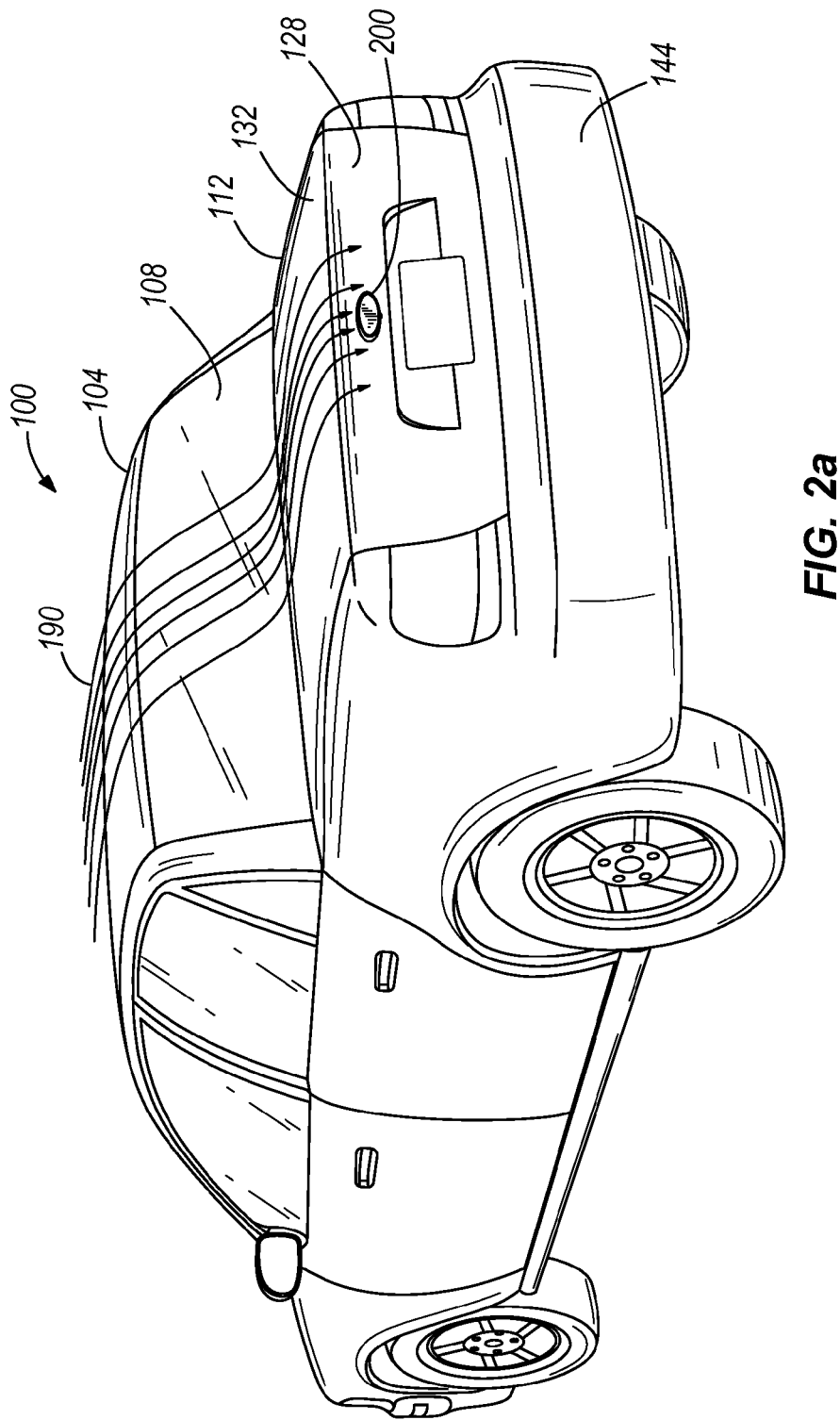
FIG. 2a is a perspective view of a vehicle showing a system for cleaning the lens of a rear view camera integrated with an emblem projecting from the trunk of the vehicle.
Figure 2C:
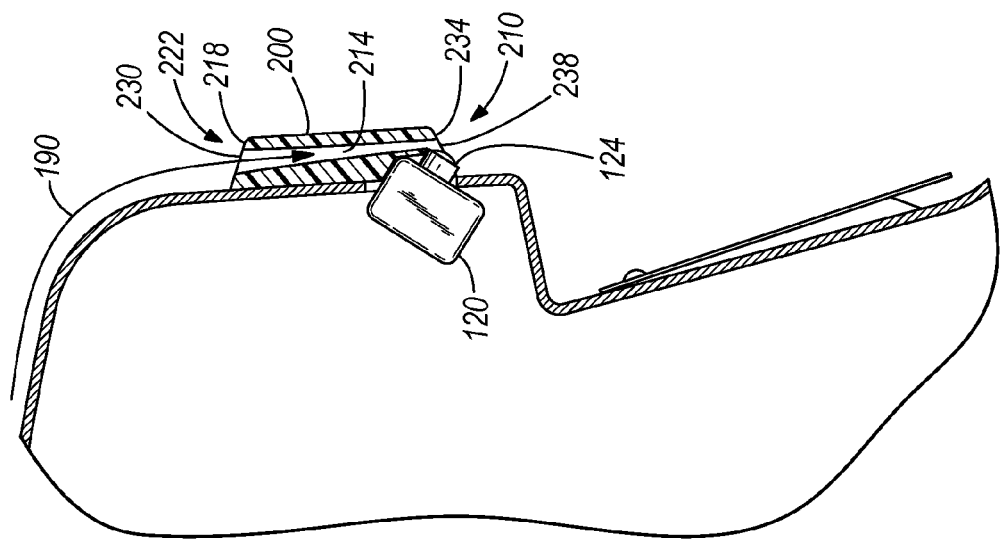
FIG. 2c is a cross section view taken along line 2c-2c of FIG. 2b.
Figure 2B:
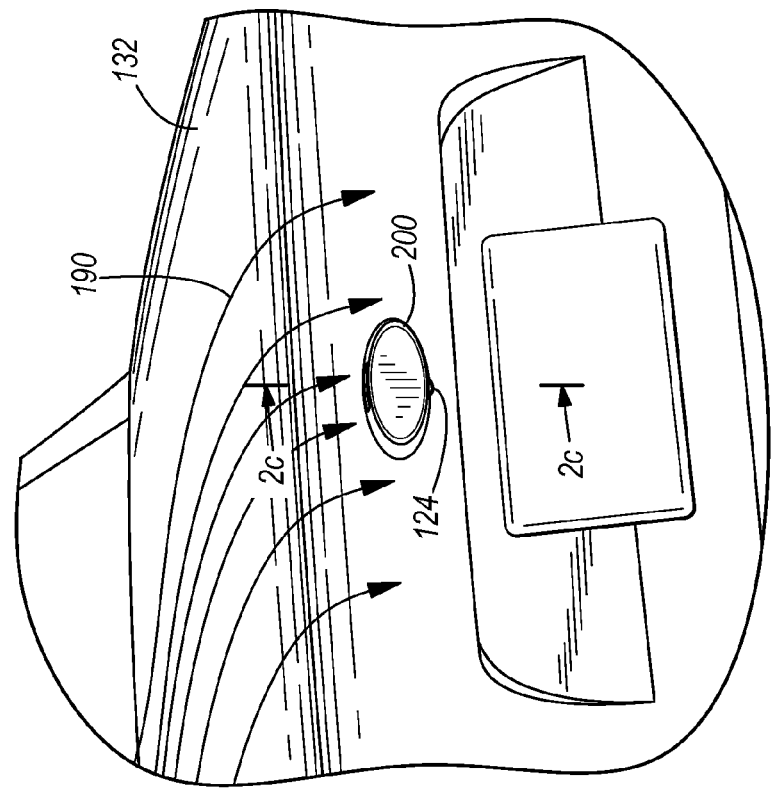
Figure 2D:
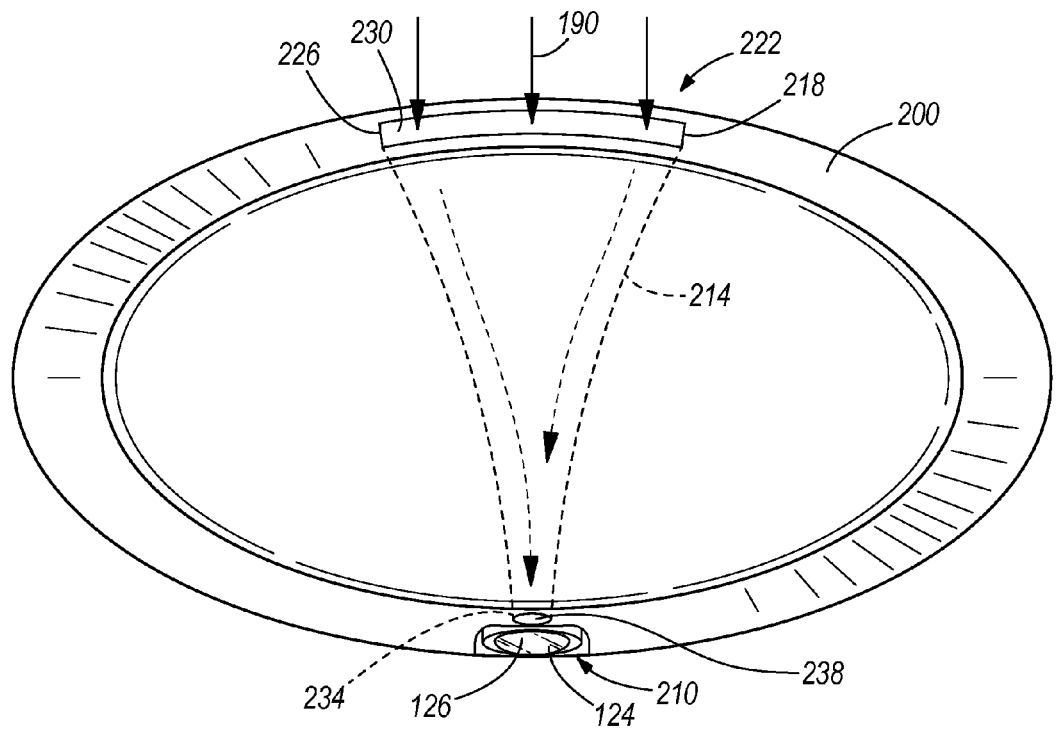
Figure 2E:
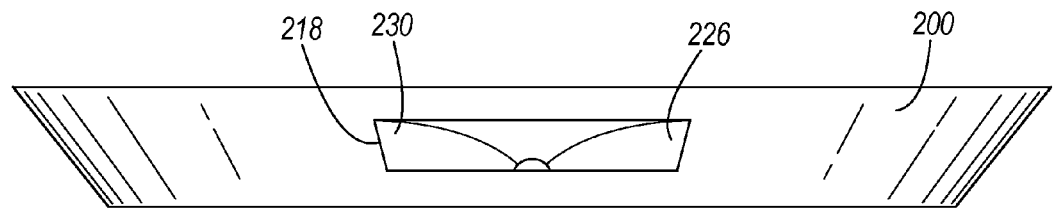
FIG. 2e is a top view of the system of FIG. 2d.

FIG. 2a illustrates a conventional motor vehicle 100 having a substantially similar roof 104, a rear windshield 108, and a trunk 112 as previously described for FIG. 1a. The vehicle 100 includes a rear-mounted projection, such as a manufacturer's emblem 200, projecting from the rear face 128 of the deck lid 132 and which may identify, for example, the manufacturer of the vehicle. A rear view camera 120 is integrated into the deck lid 132 in cooperation with the emblem 200. Referring to FIGS. 2b-2e, the camera lens 124 protrudes through a bottom portion 210 of the emblem 200 and is positioned as previously described to capture images of the rear bumper and the driving surface adjacent to the bumper and rearward. A channel 214 formed in the emblem 200 includes a first end 218 at a top portion 222. A slot 226 at the first end 218 defines a first opening 230. The channel 214 constricts or converges along its path and concludes at a second end 234 having a second opening 238 adjacent the camera lens 124. In some embodiments, the channel 214 may be defined by a cavity machined, molded, or otherwise formed during emblem manufacturing. In other embodiments, the channel 214 may comprise a section of material distinct from the emblem components and may be made of, for example, plastic or metal.

In operation, the airstream 190 created with forward motion of the vehicle flows over the rear windshield 108 and across the deck lid 132. A portion of this airstream 190 flows downward across the rear face 128 of the deck lid 132 and toward the emblem 200. A fraction of this air flows through the slot 226 and into the channel 214. This flow is directed generally uniformly to the second opening 238 where it is expelled proximate to the camera lens 124, providing a component of velocity across the lens surface 126 to inhibit or minimize the accumulation of debris and/or moisture on the lens 124, as well as to clean the lens 124 of such matter, as previously described.

Figure 3A:
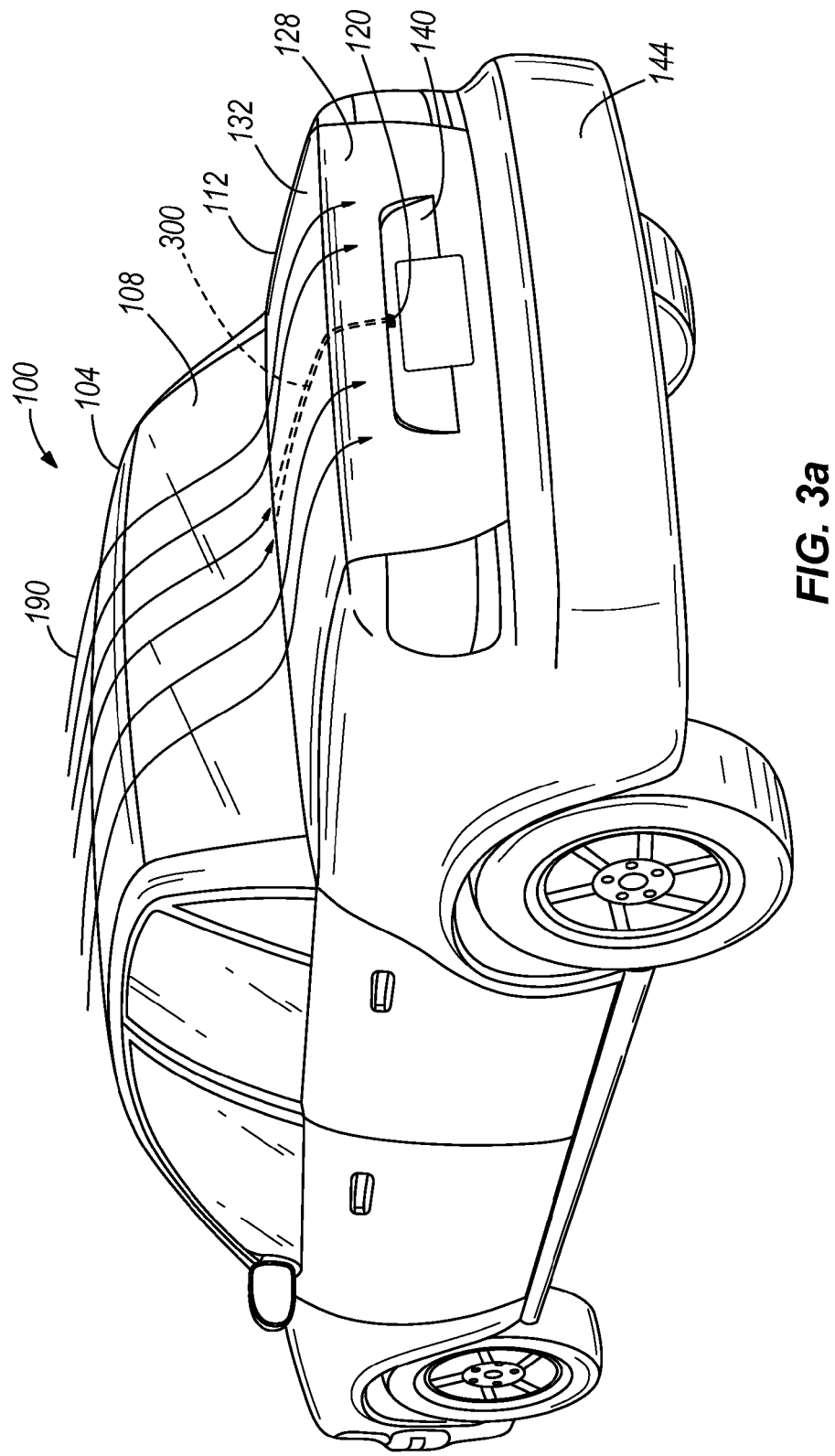
FIG. 3a is a perspective view of a vehicle showing a system for cleaning the lens of a rear view camera integrated with the trunk of the vehicle.
Figure 3B:
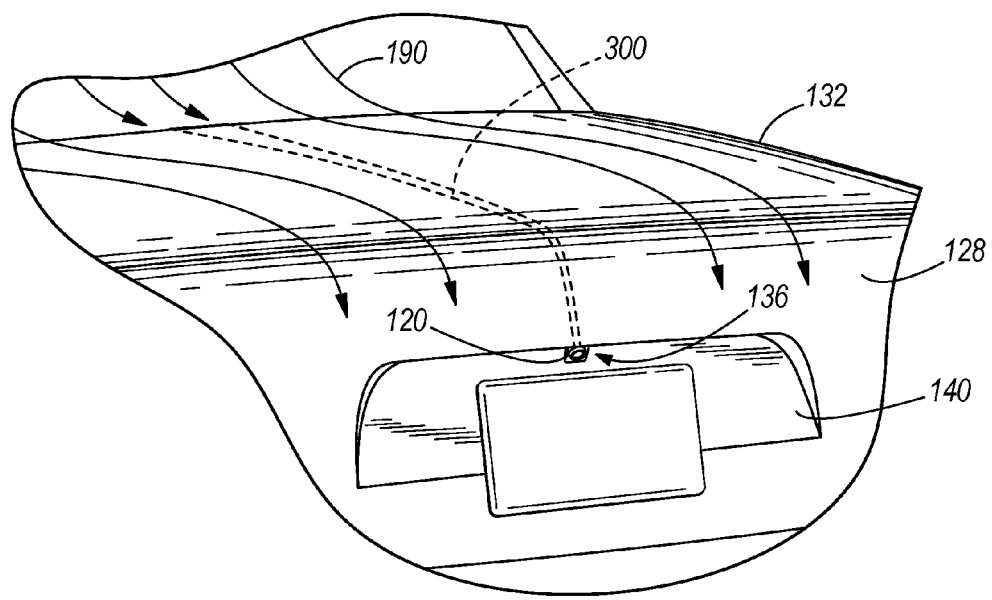
Figure 3C:
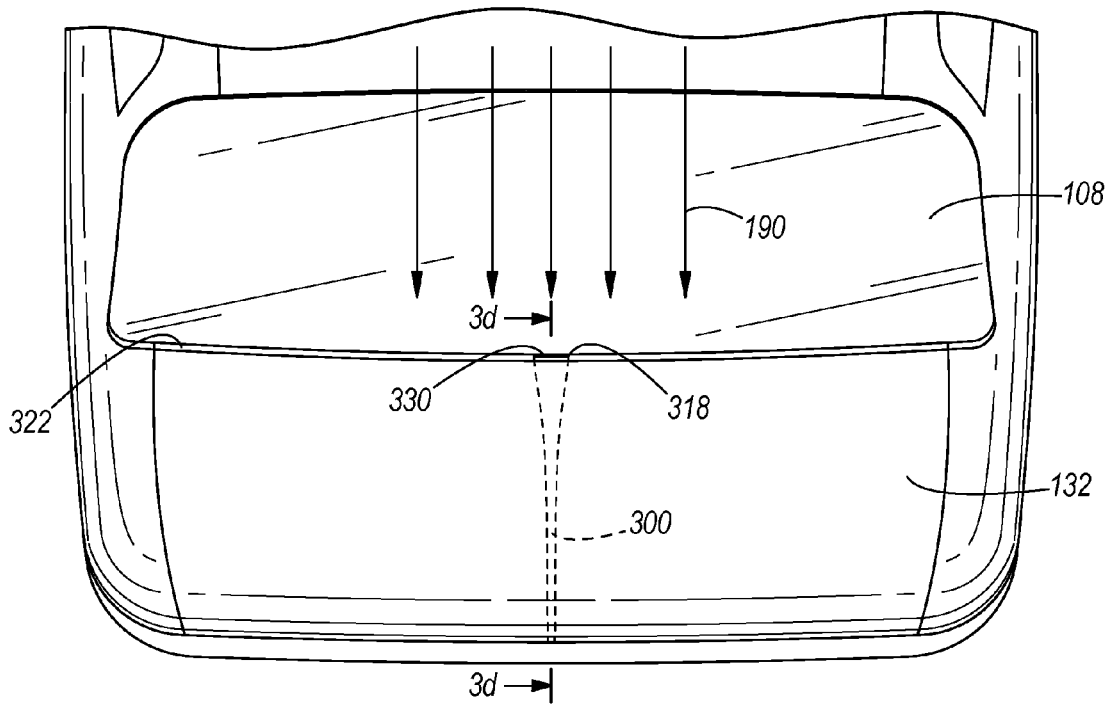

Referring to FIGS. 3a-3f, a motor vehicle 100 with a roof 104, a rear windshield 108, and a trunk 112 includes a rear view camera 120 integrated into the rear face 128 of the deck lid 132 at an upper portion 136 of the rear license plate depression 140, as previously described for the embodiment of FIG. 1a. A channel 300, in the form of a tube, includes an outlet end 310 adjacent the camera lens 124 and is configured such that an outlet channel opening 314 is facing substantially orthogonal to the camera lens surface 126. In some constructions, the channel opening 314 includes a nozzle 316 (see FIGS. 3d and 3f). The generally flexible channel, or tube 300, spans the length of the deck lid 132 adjacent an underside of the deck lid 132, from the outlet end 310 to an inlet end 318 proximate the vehicle opening 322 between the pivoting end of the deck lid 132 and the rear windshield 108 (see FIG. 3c). As shown in FIG. 3c, the inlet end 318 can be configured with an inlet channel opening 330 having dimensions greater than that of the bulk tube 300, i.e., with a cross sectional area greater than the cross sectional area of the tube 300. The inlet channel opening 330 can also accommodate a screen 334 (see FIG. 3e) to prevent the entrance of particles greater than a certain size. In some constructions, the opening 330 can additionally include a deflector projecting outward from the opening 330 to improve the diversion of air.

Figure 3G:
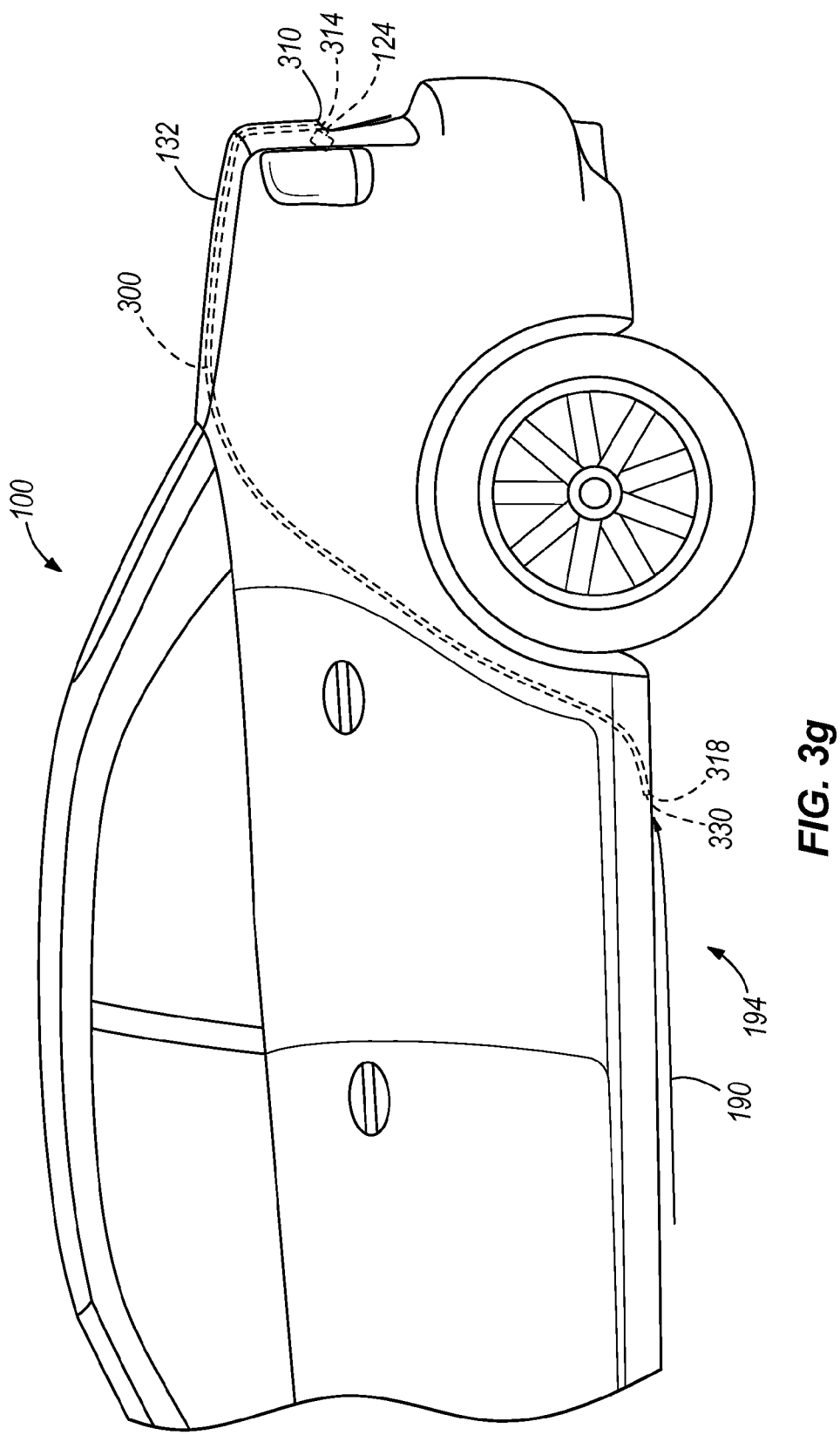
FIG. 3g is a partial side view of the rear portion of a vehicle showing a system for cleaning the lens of a rear view camera.

Referring to FIG. 3g, an alternative embodiment includes an inlet channel opening 330 positioned at a bottom portion 194 of the vehicle 100. In other constructions, the inlet channel opening 330 could be located, for example, in an already-defined vehicle feature, such as a rear gill vent. If visible, the opening 330 may be decorative in conformance with adjacent features of the vehicle 100. In still other embodiments, the inlet channel opening 330 could be positioned within the front half of the vehicle 100. The channel 300 accordingly extends from the inlet end 318 to the outlet end 310 through portions of the vehicle 100 in a manner readily known to those of skill in the art.

In operation, a portion of the airstream 190 produced with forward movement of the vehicle 100 flows into the inlet channel opening 330, which is generally facing the airstream 190. A fraction of this airstream 190 consequently flows through the length of the tube 300 to the outlet end 310 and is discharged from the outlet channel opening 314 across the surface 126 of the camera lens 124 to clean, or prevent the accumulation of matter on, the lens surface 126 as previously described. A nozzle (e.g., nozzle 316), if affixed to the outlet end 310, could enhance the uniform nature of the exiting airstream and improve the cleaning ability of the system.

The embodiments utilizing the tube 300 operate passively, meaning that only airflow generated by the movement of the vehicle during normal operation is directed through the tube 300 to the lens 124. No separate source or supply of air is required, keeping costs and the number of parts low.

While the embodiments illustrated in the figures depict sedans, the invention applies equally to other types of vehicles, including pickup trucks, sport utility vehicles, coupes, vans, minivans, and the like. The terms "trunk" and "deck lid" are generic and in some or all of the embodiments can apply also to tailgates, hatchbacks, rear doors, and the like.

Various features and advantages of the invention are set forth in the following claims.

The invention claimed is:

1. A system for minimizing accumulation of debris on a lens surface of a rear view camera of a vehicle having a trunk with a rear face, the system comprising a base member having a first side coupled to the rear face, a second side having a vehicle manufacturer emblem, and a channel extending through the base member and including a first end and a second end, wherein an opening of the first end is positioned on the rear face in fluid communication with an external airstream effected by movement of the vehicle, and wherein the second end is disposed adjacent to the lens and configured to direct a portion of the external airstream over the lens surface.

2. The system of claim 1, wherein the channel converges between the first end and the second end.

3. The system of claim 1, wherein the second end further includes a nozzle.

4. The system of claim 1, wherein the first end includes a screen.

5. The system of claim 1, wherein the first end includes a deflector for directing the portion of the external airstream into the channel.

6. The system of claim 1, wherein the second end includes a deflector for directing the portion of the external airstream over the lens.

7. A system for minimizing accumulation of debris on a lens of a rear view camera positioned on a trunk of a vehicle, the lens having a lens surface, the system comprising a base member having a vehicle manufacturer emblem with a channel therethrough and coupled to the trunk, the channel including a first end and a second end, wherein an opening of the first end is in fluid communication with an external airstream effected by movement of the vehicle, and wherein the second end is disposed adjacent to the lens and configured to direct a portion of the external airstream over the lens surface.

8. The system of claim 7, wherein the channel converges between the first end and the second end.

9. The system of claim 7, wherein the second end further includes a nozzle.

10. The system of claim 7, wherein the first end includes a deflector for directing the portion of the external airstream into the channel.

11. The system of claim 7, wherein the second end includes a deflector for directing the portion of the external airstream over the lens.

12. The system of claim 7, wherein the opening of the first end is positioned on the trunk.

13. The system of claim 7, wherein the opening of the first end is positioned on a rear face of the trunk.

* * * * *